Patented June 16, 1931

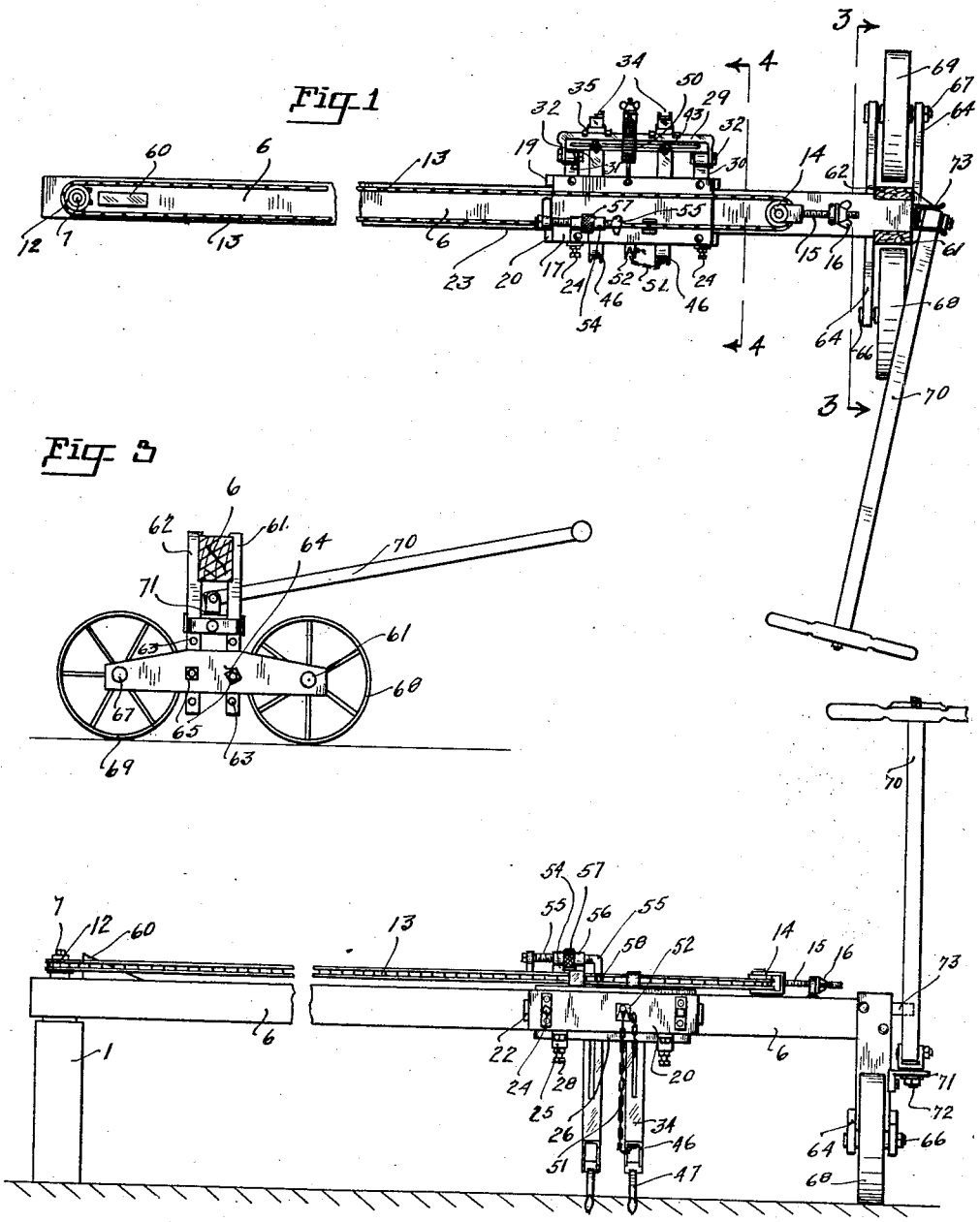

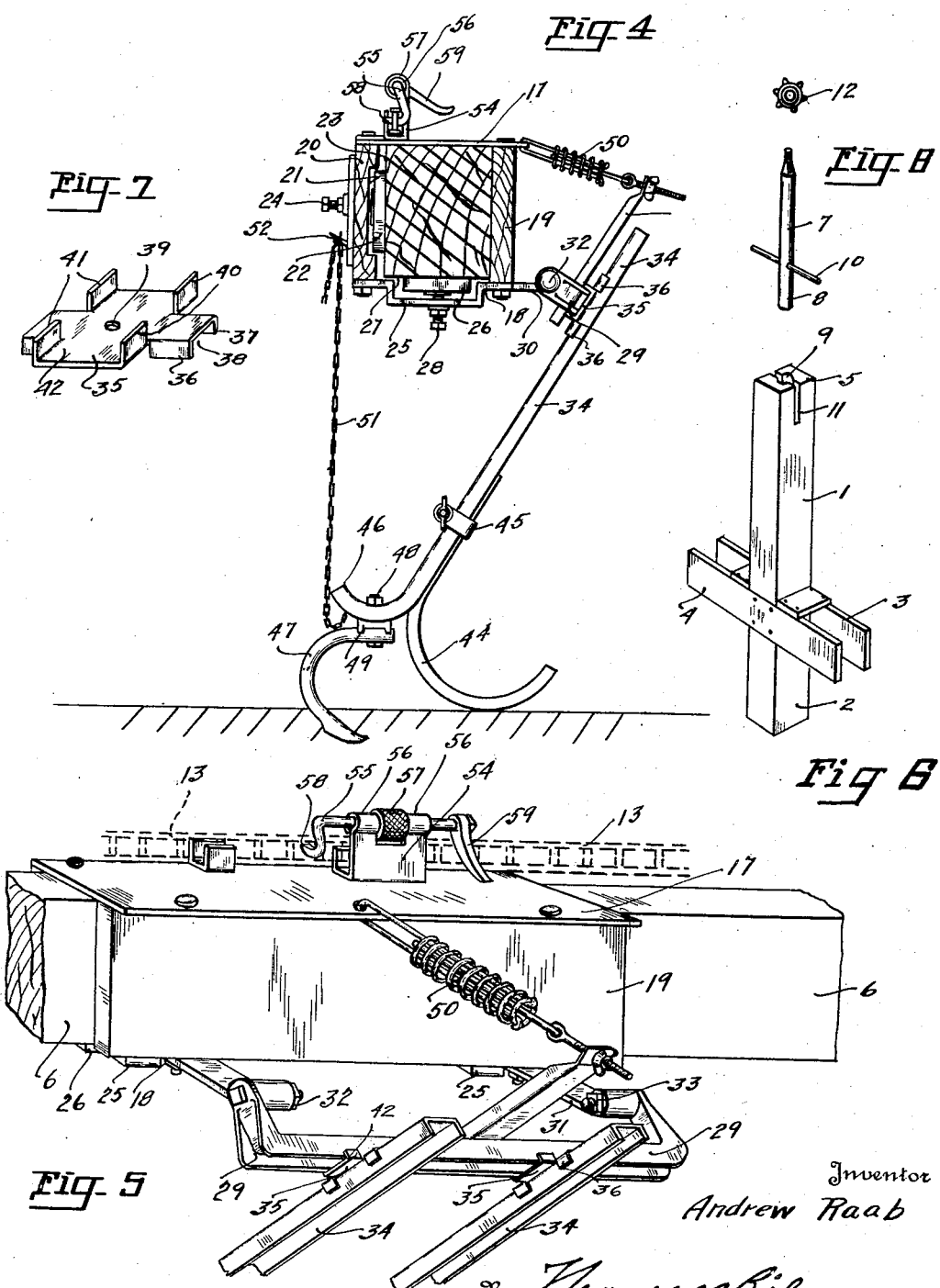

1,810,787

UNITED STATES PATENT OFFICE

ANDREW RAAB, OF PORTLAND, OREGON

AGRICULTURAL IMPLEMENT

Application filed January 12, 1929. Serial No. 332,019.

My invention relates to gardening tools and consists primarily of a body element having a reciprocable head mounted upon the body member with means for imparting measured movement to the head relative to the body element. The body element is operated relative to a stationary support about which the body element is manually rotated and as rotated the head is moved longitudinally of the body element in timed relationship with the movement of the body element about the stationary support. A handle is secured to the free end of the body element.

The primary purpose and object of my invention is to provide a device that may be used for the planting of vegetable seeds and the like. The planting being done in a precise spaced relationship with each succeeding row being disposed spirally relative to a fixed point about which the device is rotated during the planting and cultivating operation. Through the use of my device the seeds are planted and the cultivation may then be accomplished and the weeding be done to the immediate proximity of the seed row without fear of destroying the plant or the seeds after the same are planted or have sprouted and come up.

A further object of my invention is to provide simple and efficient means through the use of which a relatively large area may be completely worked, tilled and weeded in a relatively short time, and through the use of my device the burden of the operation being quite largely eliminated. In the use of my device fixed standards or supports are positioned in spaced relationship with each other and when the area about which the device is to be used has been worked, the device is then removed to the next spaced standard or support and the tilling or other operation be carried on. The device may be used with equal facility during night or day.

A further object of my device consists in providing simple and efficient means for accomplishing the result that are made relatively light so that the device can be easily handled by a single operator. The device may be used over relatively long periods with freedom from mechanical difficulties.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a top, plan view, of the assembled device.

Fig. 2 is a front view, of the mechanism illustrated in Fig. 1.

Fig. 3 is a cross section view, taken on line 3—3 of Fig. 1, looking in the direction indicated.

Fig. 4 is a cross section view, taken on line 4—4 of Fig. 1, looking in the direction indicated.

Fig. 5 is a fragmentary, perspective, rear view, of a part of the sliding head disposed upon the frame, or body member of the device.

Fig. 6 is a preferred form of embodiment of one of the standards, to be relatively fixed upon the plat, or parcel of ground, to be tilled and worked through the use of my device.

Fig. 7 is a perspective, side view, of one of the tool holders disposed upon the adjustable frame of the head.

Fig. 8 is a perspective view of the king bolt pin, one end of which is to be disposed within the supporting standard and the other end to be utilized for the driving of the feeding gear.

Like reference characters refer to like parts throughout the several views.

1 is the stationary standard, the lower end 2 of which is to be placed within the ground. The cross bars 3 and 4 are disposed at either side of the standard 1 and act as positioning bars to locate the upper end 5, of the standard in precise position and depth, relative to the area to be worked by the device. A body or frame 6 of sufficient length to cover the area to be worked is made of relatively light and strong material as cedar or spruce, if made of wood, or the same may be made of a fabricated metal frame, preferably being made of aluminum or other alloy having a low specific gravity. One end of the frame carries the king bolt 7. The lower end 8 of the king bolt 7, is adapted for engagement within the king bolt hole 9, disposed in the upper end of the standard 1. The king bolt 8 carries a cross bar 10 that is adapted for engagement within the slot 11, which prevents rotation of the king bolt 7, relative to the standard 1. The king bolt 7 carries a sprocket 12 at its upper end and a chain 13 runs about the sprocket 12 and a sprocket 14, a proper working tension being applied to the chain 13 through an eye bolt 15, thus being applied to the eye bolt and to the chain, through a thumb nut 16. A sliding head, is mounted upon the body or frame element 6, and is adapted for reciprocation along the frame. The body element is composed, primarily, of a box like structure having top and bottom plates 17 and 18 and having side walls 19 and 20. The side wall 20 has disposed therein, a channel 21 into which a friction bar 22 is disposed. The friction bar 22 is made to engage the side wall 23 of the frame element 6, and engagement is formed between the bar 22 and the side wall 23 of the frame 6, through the medium of an adjusting nut 24. The bottom plate 18 has a channel 25 formed therein into which an adjustable friction plate or bar 26 is disposed and frictional engagement is created between the bar 26 and the under face 27 of the frame 6, through the medium of an adjusting screw 28. A yoke 29 is hingedly secured to the head, through the medium of cross supporting bars 30 and 31; the connection being made through the journal pins 32 and 33. Tool holders 34 are secured to the yoke and are positioned relative to the yoke, to desired place and position; this may be accomplished through the medium of a tool holder plate 35, as illustrated in Fig. 7, wherein downwardly extending lugs 36 and 37 are formed to create a channel 38 that is of a size to fit the outer face of the tool holders 34. A hole 39 being formed centrally thereof, through which a suitable fastening 43 may be made to pass, the fastening extending through the yoke also, thus positioning the plate 35 in precise position upon the tool holder 34. Upwardly extending lugs 40 and 41 are formed from the plate 35 to form a channel 42 into which the yoke 29 is slidably positioned. Slots being formed within the tool holders 34 and with the yoke 29 through which the fastening 43 passes, thus permitting the adjustable positioning of the tool holders and the yoke into desired placement. A depth regulator 44 is positioned on the lower end of the tool holder 34 and is secured thereto by any suitable fastening means, as by a clamp 45. The lower end of the tool holders 34 are upturned, as illustrated at 46 to form a proper support for the cultivator holders 47, cultivator holders 47 being removably secured to the tool holder by any suitable fastening means, as by a bolt 48; a bushing 49 being disposed between the cultivator tool and the tool holder, through which the fastening 48 passes. A compressible element 50 maintains the depth regulator 44 in intimate contact with the ground, over which the same passes. In order to place the cultivator assembly out of engagement with the ground, the lifting chain 51, secured to the upturned end 46 of the tool holder may be made to engage the supporting hook 52 and at the same time placing tension or compression within the flexible element 50. The movement of the head assembly relative to the frame is accomplished through the rotation of driving chain 13 about the sprockets 12 and 14. The rotation of the chain is accomplished in this manner: The frame 6 carries the king bolt 7 which in turn carries the sprocket 12 and the lower part of the king bolt is secured in the standard 1. As the frame is rotated about the king bolt, rotation is imparted to the chain 13 since the sprocket 12 rotates. The head assembly is locked to the chain by the action of bar 55 which has its engaging point 58 within a link of the chain. As the chain rotates there is imparted to the head a longitudinal movement relative to that of the frame. A bracket 54 is secured to the top plate 17 and engagement is created between the bracket 54 and the chain 13 by the bar 55. The bar 55 is journaled within suitable bearings 56 disposed within the bracket and the bar 55 is threaded through the body portion and is adjustably positioned relative to the bracket, through the adjusting threaded hand element 57, thereby positioning the sliding head to a precise position relative to the row to be cultivated. An engaging point 58, as illustrated in Fig. 5, is adapted for engagement within the links of the chain. As the links of the chain are made to move longitudinally of the frame, the sliding head is moved thereby longitudinally of the frame. A tail piece 59 is secured to one end of the bar 55 and as the head is moved to the end of the frame, the tail piece is made to engage the cam member 60, illustrated in Fig. 1, thereby partially rotating the bar 55 and disengaging the point 58 from the link of the chain. The rate of movement of the head relative to that the frame is predetermined by the pitch of the teeth of the sprocket 12. The placing of a larger sprocket within the chain may be compensated through the threading of the thumb nut 16 upon the eye bolt 15 primarily intended for tensioning the chain. The outer or free end of the frame of the device is supported upon vertically disposed standards 61 and 62, having adjusting holes 63 disposed therein and a bolster 64, as illustrated in Fig. 3, is secured to the standards 61 and 62 by any suitable fastening means, as by bolts 65. The bolster 64 is supported upon axles 66 and 67 and supporting wheels 68 and 69 rest upon the axles. A handle 70 is secured to the standards 61 and 62 through the medium of a bracket 71 and is rotatably secured relative thereto by a supporting pin 72. The handle 70 may be held in an upright, inoperative position, through the supporting latch 73.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination of a structural body element, a fixed standard for supporting one end of the body element, a king bolt comprising a pin having a thread disposed on its one end and a cross bar secured on the pin a substantial distance from the other end connecting the body element with the fixed standard, said cross bar constituting means for maintaining the king bolt relatively fixed to the supporting standard, a tool holder head slidably positioned upon the body element, a sprocket threadably disposed upon the upper end of the king bolt, a chain passing about the sprocket, means for securing the tool holder head to the chain, to cause the head to travel longitudinally of the body element as the body element is rotated about the fixed supporting standard, tool holders depending from the tool holder head, and tools removably secured to the tool holders.

2. In a device of the class described, the combination of a body element having a cam member near one end and an eye bolt disposed near its other end, a stationary support associated with one end of the body element, a driving element fixed relative to the supporting standard about which the frame may be rotated in a relatively fixed path, a head slidably mounted upon the body element, a yoke comprising a furcated element having openings at its ends and through its back rearwardly extending from the head and hingedly secured thereto, tool holders adjustably positioned upon said yoke, and means for imparting a predetermined rate of travel of the head longitudinally of the body element.

3. In a cultivating device, in combination with cultivating implements, a stationary standard having a hole and slot disposed in the top thereof, a king bolt disposed within the hole and having a cross bar disposed within the slot, a solid frame body disposed upon the stationary support at its one end and upon movable supports on its oppositely disposed end, an eye bolt adjustably secured to the body frame, a sprocket disposed within the eye bolt, a sprocket disposed on the king pin oppositely disposed from the eye bolt, an endless sprocket chain disposed about said sprockets, a tool holding head slidably disposed about the body frame, a bracket disposed on the top thereof, a locking mechanism adjustably positioned thereon, said locking mechanism adapted to being automatically disengaged when the tool holder has traveled longitudinally of the frame a predetermined distance, and tool holders removably depending from the tool holding head.

4. In a cultivating device, in combination with cultivating implements, an implement carrier comprising top and bottom plates and side walls secured together, a friction bar adjustably disposed on one of the side walls, a friction bar adjustably connected with the bottom plate, supporting elements extending from the bottom plate, a yoke detachably connected thereto, said yoke having a tension holder centrally extending therefrom, and tool holder plates secured upon the outer wall of the yoke, and automatic locking means disposed on the top plate of the implement carrier.

5. In a cultivating device, in combination with an implement carrier, locking means adapted to lock the carrier with an endless carry chain of the cultivating device comprising a bracket disposed on the top side of the carrier, said bracket having supporting bearings disposed on both its ends, a bar having an engaging hook at its one end and a trip lever at its other end being disposed through the supporting bearings, and an adjustment knob disposed between the supporting bearings and threadably connected with the bar.

ANDREW RAAB.